UNITED STATES PATENT OFFICE 2,419,599

ALKYLATION OF AROMATIC HYDROCARBONS

Walter A. Schulze, Bartlesville, Okla., assignor to Phillips Petroleum Company, a corporation of Delaware No Drawing. Application October 5, 1942, Serial No. 460,845

9 Claims. (Cl. 260—671)

This invention relates to the production of alkyl homologs of benzene by the catalytic akylation of the benzene nucleus with unsaturated hydrocarbons in the presence of solid contact catalysts. More specifically this invention relates to an improved process for the production of monoalkyl benzene derivatives by the selective alkylation of the benzene nucleus with olefins having two to six carbon atoms per molecule. This application is a continuation-in-part of my co-pending application Serial No. 450,801, filed July 13, 1942.

The alkylation of aromatic hydrocarbons wherein an alkyl, cycloalkyl or aralkyl group is introduced into the aromatic nucleus has long been known and has been practiced with a variety of so-called Friedel-Crafts catalysts and strong mineral acid condensing agents. While classical procedures employed alkylating agents in the form of alkyl halides, alcohols, etc., the present tendency is to employ olefins directly and to conduct the reaction in the form of a simplified catalytic combination. This development, with consequent economic benefits, has greatly altered the classical concept of the alkylation mechanism and of the necessity for employing the heretofore preferred condensing agents.

For example, with aluminum chloride, the typical Friedel-Crafts agent, the quantities of condensing agent required so far exceed normal catalytic proportions that the chemical costs and aluminum chloride sludge formation have been excessive in view of the yields obtained. Other suggested catalysts or promoters such as iron, zinc, tin, and titanium halides suffer the same disadvantages. The use of strong mineral acids such as sulfuric and phosphoric as condensing agents has also been described, but these agents also are relatively non-selective and introduce undesirable side reactions. Thus, all of these materials are capable of promoting olefin polymerization and have required careful regulation of reaction conditions, particularly temperature, to maintain alkylation as the predominant reaction. Even with precautions, poor yields, high catalyst consumption, and non-selective alkylation have usually resulted.

While the use of liquid acids or acid solutions may be necessary or desirable in certain applications, the use of liquid catalysts introduces the problem of maintaining contact between immiscible hydrocarbon and non-hydrocarbon phases, and subsequently separating and recovering said phases essentially uncontaminated. Catalyst recovery operations and purification of the hydrocarbon products may tend to increase operating costs. Also, when corrosive materials are handled, special equipment and corrosion-resistant alloys are involved and investment costs may be high. On the other hand, when the solid catalysts disclosed hereinafter are employed in the form of beds or contact masses of suitable particle size, the operating procedures are much simpler and more economical. Thus, with solid contact catalysts, the reactant fluids may be passed into reaction zones containing said catalysts and withdrawn therefrom in such a manner that the desired intimacy of contact, the reaction time, and other reaction conditions may be essentially governed by adjusting the flow rate, temperature, and composition of the reactants.

It is an object of this invention to provide an improved process for the alkylation of aromatic hydrocarbons with olefin alkylating agents. Another object of this invention is to provide an improved process for the alkylation of benzene with propylene or a butylene in which a novel type of solid alkylation catalyst is employed. Still another object of this invention is to provide an improved process for the synthesis of alkyl benzenes in the presence of solid adsorbent contact catalysts and under conditions such that alkylation proceeds smoothly and mono-alkyl benzene predominates in the reaction products. The process disclosed is of particular value in the manufacture of substantially pure isopropylbenzene, secondary butylbenzene and tertiary butylbenzene, which are preferred additives for aviation fuels.

It has now been found that the alkylation reaction typified by the formation of isopropylbenzene from benzene and propylene is smoothly effected in the presence of solid adsorbent catalysts comprising silica and an oxide of a metal of group III B or IV A of the periodic system, preferably in the form of synthetically prepared silica gel promoted by relatively minor proportions of the metal oxide. Such catalysts have heretofore been used to promote olefin polymerization and various high temperature cracking reactions, but the process of the present invention involves a novel adaptation in the field of cyclic or aromatic hydrocarbon synthesis. The preferred reaction conditions disclosed herein, the clean cut nature of the alkylation reaction over the specific silica-alumina catalysts, and the absence of strong acids commonly employed in so-called "acid alkylation" represent a distinct improvement over conventional alkylation procedures.

The alkylation reaction over the catalysts of this invention is also extended to the use of other olefin alkylating agents or combinations thereof such as ethylene and the various butylenes and higher homologs, particularly those of six or fewer carbon atoms per molecule. However, such alkylating agents are not full equivalents in the operations described and, in general, require different conditions for efficient alkylation so that the olefins may also be considered as separate and distinct alkylating agents.

The process of the present invention comprises the contacting of controlled proportions of aromatic hydrocarbon and olefin alkylating agent with an adsorbent silica-metal oxide gel-type catalyst under alkylating conditions chosen with regard to the particular olefin alkylating agent so as to produce a satisfactory degree or even substantially complete conversion thereof. The hydrocarbon feed mixture may be passed continuously through a stationary bed of granular catalyst, or otherwise contacted with the solid catalyst, and the catalyst effluent may be either continuously or intermittently fractionated to recover alkylate from unconverted feed components. Subsequent fractionation may be employed to remove minor amounts of poly-alkylated product from the mono-alkylate. Ordinarily, an excess of aromatic hydrocarbon is present in the feed, and unconverted aromatic compound may be returned to the catalyst with additional quantities of the olefin alkylating agent.

In a specific preferred embodiment of the invention, benzene in admixture with the desired molar proportion of propylene is contacted at an operating pressure such as to maintain a substantial amount of liquid phase, generally in the range of about 100 to 1000 pounds gage at a temperature in the catalyst space within the range of about 200 to about 450 F., with a silica-metal oxide gel catalyst such as silica-alumina. The reactant flow rate and, therefore, the contact time within the catalyst space is usually chosen to permit extensive reaction of the propylene, so that the liquid products from the catalyst comprise mainly unconverted benzene and monopropyl benzene. Although the temperatures are such that in the absence of benzene polymerization of the olefins occurs to appreciable extents, especially under usual operating pressure and concentrations, the presence of large concentrations of benzene inhibits this tendency quite effectively, even when the olefin concentration is still relatively high. It is noted that in this reaction, as in many other alkylation reactions, the alkyl derivatives of C₃ and higher olefins exhibit a branched rather than a straight-chain structure in the side chain. Thus, propylene yields isopropyl derivatives instead of n-propyl derivatives, although the formation of the latter may occur to a limited and somewhat variable extent. These products are then separated in conventional fractionating equipment, and the benzene is returned to the charge source. When the total alkylate may be used, the final fractionation may, of course, be eliminated. However, in most instances, the mono-alkylate is the most valuable product, and segregation may be correspondingly thorough. At higher temperatures, high pressures often result in a dense phase which gives most of the benefits of liquid phase operation even though the temperatures are above the critical for the mixture treated. If desired, true liquid phase operation may be secured by adding a heavier inert hydrocarbon material having a sufficiently high critical temperature.

Operation according to this scheme may be either batch-wise or continuous, with the latter usually preferred. If desired, a plurality of catalyst cases may be provided so that a batch of catalyst may be replaced without interrupting operation of the processs. Other means of introducing the olefin or olefin-containing gases to the reaction zone may be employed. For example, olefin may be added at one or more points directly into the catalyst chamber, or such multipoint addition may be utilized to maintain a predetermined olefin concentration at various points within the catalyst space. Olefin-concentration control may also be effected by re-circulating a substantial unseparated portion of the effluent, with addition of reactants only at a single point in the cycle. Temperature control within the catalyst space may be obtained by regulation of feed pre-heating means, or heat exchange devices may be provided within or about the catalyst. Other modifications and adaptations of conventional process equipment will be suggested from the accompanying disclosure.

The solid adsorbent catalysts which are a feature of the present process are characterized by their chemical composition, their physical properties and specific methods of preparation which account for their catalytic activity. Although these catalysts are broadly referred to as silica-metal oxide compositions it is important to further define the origin, physical structure, and chemical composition in order to differentiate the catalysts active in the present process from naturally occurring minerals which contain some of the same components but which have distinctly different catalytic properties under the terms of this invention. The preferred catalysts of this invention are of such a nature that it is possible to choose conditions for the present process which provide excellent selectivity toward alkylation without incurring extensive olefin polymerization. Thus the temperatures employed for alkylation with propylene are ordinarily below those supporting active propylene polymerization, while if less active catalysts are employed at higher temperatures, the extent of polymerization may be greatly increased with consequent losses of reactants and contamination of alkylated products. The same is true for other olefins.

The natural and synthetic metal silicates were originally studied with regard to their polymerizing qualities, and it was noted that catalysts of superior activity resulted from synthetic preparations involving formation of the oxides in gel form and not necessarily in the proportions found in nature. It was also noted that when the gel structure was not produced or was destroyed that the physical and catalytic properties of the materials were usually unsatisfactory. Suitable silica-alumina catalysts have been prepared by the methods described by McKinney in U. S. Patents 2,142,324 and 2,147,985 and employed in polymerization of gaseous olefins. The present invention enables the use of similar silica gel catalysts activated with alumina at temperatures and/or pressures appreciably below those initiating rapid polymerization of the particular olefin alkylating agent.

In general, these catalysts are prepared by first forming a hydrous silica gel or jelly from an alkali-silicate and an acid, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of an aluminum salt, a hydrolyzable salt of a metal selected from group III B or from group IV A of the periodic system, and may be referred to in general as "silica-alumina type" catalysts. More particularly, salts of indium and thallium in addition to aluminum in group III B may be used, and salts of titanium, zirconium and thorium in group IV A may be used to treat silica gel and to prepare catalysts of this general type. Boron in the form of boric acid, or a soluble borate such as sodium borate, may be incorporated with silica gel. Whether prepared by this method or by some modification thereof, the catalyst will contain a major portion of silica, and a minor portion of metal oxide. This minor portion of metal oxide, such as alumina, will generally not be in excess of 10% by weight, and will more often, and generally more preferably, be between about 0.1 and 1.5 or 2% by weight.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of one or more of the metals indicated, with the sulfate or chloride being preferred. Other alternate salts include acetates and nitrates. The adsorption of the hydrous oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and the metal oxide.

Modifications may be made in the foregoing procedure and catalysts of suitable activity may result. One obvious alternative is the addition of the metal salt to the silicate before gelation. This method enables the incorporation of greater proportions of metal oxide, but activity may not be proportional to increasing metal oxide contents above about 1 to about 15 weight per cent so that little is gained by the modification and the proper degree of salt and acid removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

As indicated above, the finished gel-type catalysts comprise essentially silica and metal oxide, with variant quantities of water. The metal oxide may be present in minor activating quantities of about 1 to about 15 weight per cent of the total oxides. In many instances, catalytic activity may be as great with about 1 to 5 per cent of metal oxide as with about 10 to 15 per cent. Still greater amounts up to about 50 weight per cent may be added if desired, although the physical characteristics and activity of the catalyst may be adversely affected. In order to retain the selectivity of the catalyst for the present reaction, other heavy metal oxides than those hereinbefore recited, or salts are usually absent from the starting materials and the finished gel.

The activity of the catalysts prepared by this method is usually enhanced in the present process by a mild dehydration treatment at temperatures of about 200 to about 300 F. just prior to introduction of the hydrocarbon feed. The dehydration is usually accomplished by passing a stream of an inert hydrocarbon or other gas through the catalyst bed at the designated low temperatures. This dehydration may, of course, be accomplished gradually during operation through the agency of the feed mixture, but an initial period of somewhat low conversion may result. Prior to this step, drying temperatures in the catalyst preparation procedure are not usually higher than subsequent initial operating temperatures.

The hydrocarbon feed contacted with the catalyst comprises benzene and olefin in a controlled mol ratio which is chosen with regard to the desired alkylate composition. In order to produce predominantly mono-alkylate, it is desirable to employ an excess of benzene to reduce the olefin concentration and the probability of reaction of olefin with the alkyl benzene. However, the huge excesses of benzene favored by the prior art are not necessary in the present process, and high yields of mono-alkylate result from the use of a moderate excess of benzene in the catalyst zone. Satisfactory feed mixtures may contain benezene-olefin mol ratios of between about 1:1 and 10:1, with an intermediate value of about 4:1 apparently very suitable from the standpoint of economical operation. Ratios lower than about 1:1 produce large amounts of heavy alkylate.

The temperature within the catalyst bed is chosen to conform to the catalyst activity, the composition of the feed and of the materials in the reaction zone, the olefin reactant, the operating pressure, and the contact or reaction time in order to secure most efficient conversion. Suitable temperatures over the range of preferred operating conditions are usually within the range of about 200 to about 700 F., with a somewhat narrower range for each individual olefin. Particularly when reacting benzene with olefins of three and more carbon atoms per molecule, relatively mild temperatures below 450 F. are preferred and give efficient results. Thus, for propylene a temperature in the range of about 250 to about 450 F. is generally preferred, with satisfactory operation generally below 375 F. with butenes and heavier olefins somewhat lower temperatures are suitable. Although higher temperatures may, of course, be employed, the effect is to reduce the selectivity of reaction and with the extremely active catalysts described and with the higher-molecular weight olefins such higher temperatures often promote undesired cracking and in general are otherwise usually less efficient and desirable. Temperatures above those at which substantial cracking of the hydrocarbons present may occur should be avoided and the desired results may be most effectively obtained through the use of the catalyst and reaction conditions described herein. When feed mixtures containing a large excess of benzene and relatively high flow rates are used, somewhat higher temperatures in the stated range may be employed. On the other hand, with extremely active catalysts, low benzene-olefin mol ratios, highly reactive olefins and longer contact times, the most advantageous temperatures will be substantially lower, and in some instances may even be below 200 F. The interdependence of these factors will be evident to those skilled in the art, and optimum conditions for individual applications may be readily determined by experiment.

Since the alkylation reaction is exothermic, means for dissipating any excess heat and preventing temperatures from rising above the preferred range are ordinarily provided. Such means may include cooling the catalyst bed by internal or external heat exchange apparatus, or more conveniently by reducing the amount of preheat supplied to the feed ahead of the catalyst. Excessive temperatures may increase the yield of polyalkylated products, or, may promote olefin polymerization. In general, the catalyst is maintained in the beginning at the lowest temperatures which satisfactorily support alkylation with the feed composition and flow rate employed. A gradual decline in catalyst activity with use can often be offset and reaction rate maintained at suitable levels by gradually and progressively increasing the operating temperature within the specified range. However, if the temperature increases are continued to the point that proportions of polyalkylate and/or polymer are greatly increased, continuance of this method of prolonging catalyst life may become uneconomical and a more active catalyst mass should be placed into operation.

Catalyst life in the present process is ordinarily very long, since the relatively low temperatures and the preferred liquid phase operation both tend to prevent the accumulation of tarry poisons and carbonaceous deposits. Thus, several hundred volumes of alkylate may often be produced per volume of catalyst before any significant change in activity is evident. The catalyst is not retained in service after conversion declines seriously and/or excessive temperatures are required for satisfactory reaction rates. The spent catalyst may be replaced and treated for reactivation or recovery of the ingredients.

Operating pressures are chosen in accordance with reaction requirements, and particularly with the reaction temperature. The alkylation is apparently promoted to some extent by pressure which may also increase the olefin concentration when the olefin is normally gaseous. Thus, increasing pressures seem to promote conversion and enable rapid reaction rates at somewhat lower temperatures and/or shorter contact times. The preferred pressures are usually in the range of 50 to about 1000 pounds gage, or, more specifically, those pressures which are required to maintain essentially liquid phase operation and/or produce suitable concentrations of olefin in the benzene feed. Since the critical temperature of benzene is above the preferred temperature range, the latter function is often more important.

When temperature and pressure conditions are selected to conform to the catalyst activity and desired extent of conversion, rather high flow rates of reactants may be employed. Thus, with the preferred catalyst of this invention, flow rates are ordinarily between about 0.1 and about 10 liquid volumes of feed per hour per volume of catalyst. These liquid flow rates, while providing excellent throughput of reactants per volume of catalyst, are not sufficiently high to cause packing, channeling, and pressure drop in the bed of granular catalyst.

The feed stocks for the process may be derived from any suitable sources, such as petroleum refining processes which produce both aromatics and olefin hydrocarbons, or from unrelated sources when process economics are favorable. When the present invention is utilized as a highly selective chemical synthesis, it is advantageous to employ benzene of relatively high purity and an olefin of corresponding purity or in gaseous mixtures with substantially inert compounds such as corresponding paraffins. The use of relatively pure benzene also results in longer catalyst life and purer products since the presence of impurities in the benzene boiling range may lead to the production of compounds of such boiling range to contaminate the alkylated products. Non-hydrocarbon impurities such as sulfur compounds are also objectionable because of possible contamination of the products.

The alkylating agent may be an individual olefin of high purity, or simple olefin mixtures, or if these are not available or economical, paraffin-olefin mixtures may be employed. In this case, the paraffin merely acts as an inert diluent and can be handled satisfactorily by perhaps increasing the concentration of paraffin-olefin hydrocarbons in the feed and then providing for removal of the paraffin from the liquid products at some point chosen to interfere least with the subsequent fractionation steps. The olefin-containing mixture may even include other hydrocarbons of substantially lower or higher boiling point, particularly paraffins which will be substantially unreacted. Such wide boiling range mixtures, however, are not ordinarily used since better segregation of the olefin is not a particularly difficult operation. Appreciable amounts of methane and lighter gases which necessitate higher pressures in the catalyst vessel are undesirable. It is generally desirable to have other unsaturated hydrocarbons, such as acetylenes and more reactive olefins, substantially absent.

The subsequent handling of the alkylate produced will depend largely on the intended uses for the products. In many instances, a substantially pure isopropylbenzene or a butylbenzene may be required for inclusion in high octane aviation fuels, and the purity of the aromatic additive is governed by the existing fuel specifications. In other uses, the purity may be governed by similar considerations, and mixtures of propyl and butyl benzenes, or of various butylbenzenes may be produced, if desired.

The heavy alkylate produced by the process consists essentially of alkyl benzenes, and these products may be isolated in high purity as are the mono-alkylates. Subsequent uses of the di-alkyl benzenes may be selected on the basis of the greatest return from their utilization. Possible uses include treatment to convert the di-alkylate largely to mono-alkylate, or addition of the di-alkylate to motor fuels within the limits allowed by fuel specifications.

In order to further illustrate the specific uses and advantages of the present invention, the following exemplary operations will be described. However, since these and numerous other process modifications will be obvious in the light of the foregoing disclosure, no undue limitations are intended.

Example I

A silica-alumina gel-type catalyst was prepared by the steps of (1) forming silica hydrogel by introducing sodium silicate solution into excess sulfuric acid; (2) washing and partially drying the gel to a $SiO_2:H_2O$ ratio between one and two; (3) activating the partially dried gel by boiling in a solution of iron-free aluminum sulfate; (4) washing the activated gel to remove free acid and salts and finally drying to form hard, glassy granules. This catalyst was used in 12/20 mesh size to alkylate benzene with ethylene.

The feed mixture contained ethylene dissolved in benzene under about 400 pounds gage pressure to give a benzene-ethylene mol ratio of about 5:1. The feed was preheated to 500 F. and passed through the catalyst at the above mentioned pressure and at a flow rate of 1.3 liquid volumes per hour per volume of catalyst, which corresponds to a reaction of about 46 minutes. The reaction proceeded to substantially complete conversion of all of the ethylene reacted to ethylene derivatives of benzene over a prolonged operating period. Liquid products from the catalyst chamber were collected at lowered pressures and fractionated. The approximate composition was as follows:

| Compound | Liquid Volume Per cent |
|---|---|
| Benzene | 85.4 |
| Ethylbenzene | 11.0 |
| Diethylbenzene | 2.5 |

Under these conditions, the alkylated products contained about 81 per cent of ethylbenzene. No unsaturates were present in the products indicating that ethylene polymerization and other side reactions were negligible. No evidence of catalyst decline was noted during the synthesis of over 100 volumes of alkylate per volume of catalyst.

Example II

A synthetic gel-type catalyst was prepared by activating partially dehydrated silica hydrogel with a hot solution of aluminum and zirconium chlorides. After washing free of acid, and water-soluble salts, and drying to hard granular gel form the catalyst contained silica, alumina, and zirconia in the approximate weight ratio of 95:4:1.

A charge mixture of benzene and ethylene in the mol ratio of 6:1 was passed over this catalyst at a flow rate of two liquid volumes per volume of catalyst per hour, which corresponds to a reaction time of about 30 minutes. The temperature was maintained between 500 and 530 F. and the pressure was 800 pounds gage. Fractional distillation of the liquid effluent produced alkylate containing 86 per cent ethylbenzene and the balance diethylbenzene when the ethylene was substantially completely reacted.

Example III

A silica-alumina gel-type catalyst was prepared as in Example I. This catalyst was used in 12/20 mesh size to alkylate benzene with propylene.

The feed mixture contained propylene dissolved in benzene under about 400 pounds gage pressure to give a benzene-propylene mol ratio of about 2:1. The feed was preheated to 350 F. and passed over undehydrated catalyst at 400 pounds gage and a flow rate of two liquid volumes per hour per volume of catalyst, which corresponds to a reaction time of about 30 minutes. After a period of low conversion while some water was removed from the catalyst, the reaction proceeded rapidly at temperatures between about 350 and 400 F. Liquid products from the catalyst chamber were collected at about atmospheric pressure and fractionated. The composition was as follows:

| Compound | Weight Per cent |
|---|---|
| Benzene | 46.8 |
| Isopropylbenzene | 40.1 |
| Diisopropylbenzene | 13.1 |

Under the described conditions, the alkylated products contained about 75 per cent isopropylbenzene and propylene polymerization as well as decomposition reactions were negligible. The reaction was halted after preparing over 100 volumes of alkylate per volume of catalyst with substantially equivalent rate and extent of conversion.

Example IV

A catalyst similar to that of Example I was dehydrated at 250 F. in a stream of propane and then used to alkylate benzene with propylene in a feed mixture containing about 4 mols benzene per mol of olefin. The reaction was initiated at 300 F. and 400 pounds gage pressure, while the feed flow rate was between 1.2 and 1.5 liquid volumes per hour per volume of catalyst, corresponding to a reaction time between about 50 and about 40 minutes. During the production of several hundred volumes of alkylate per volume of catalyst, the reaction temperature was maintained between 300 and 400 F. Fractionation of the total product showed the following composition:

| Compound | Weight Per cent |
|---|---|
| Propylene | 0.4 |
| Hexene | 0.2 |
| Benzene | 74.0 |
| Nonylenes | 0.8 |
| Isopropylbenzene | 18.9 |
| Diisopropylbenzene | 5.6 |

The alkylate yield thus closely approached the theoretical, based on the propylene charged, and the alkylate, after removal of unconverted benzene for recycle, contained about 81 per cent of isopropylbenzene.

Example V

A feed mixture containing benzene and propylene in the molar ratio of 8:1 was treated over a silica-alumina gel catalyst at temperatures in the range of 300 to 330 F. and at 250 pounds gage pressure. The liquid products were fractionated and showed the following average composition over an extended period.

| Compound | Weight Per cent |
| --- | --- |
| Benzene | 82.7 |
| Isopropylbenzene | 15.7 |
| Diisopropylbenzene | 1.6 |

The alkylated products contained about 90 per cent of isopropylbenzene.

Example VI

A synthetic gel type catalyst consisting of silica promoted with a minor proportion zirconia was prepared by mixed precipitation of the hydrous oxides, washing to remove free acid and water soluble salts and drying to hard granular form. Benzene and propylene in a molar ratio of 5:1 were passed over this catalyst at a temperature of 350 F., 300 pounds gage pressure, and a flow rate of 1.5 liquid volumes of charge mixture per volume of catalyst per hour, which corresponds to a reaction time of about 40 minutes. After prolonged use of the catalyst, the temperature was gradually raised to 400 F. to maintain the rate of propylene conversion. The alkylate produced over this temperature range contained isopropylbenzene and di-isopropylbenzene in the volume ratio of about 3:1.

Similar results were obtained when using as catalyst a synthetic gel composition consisting of silica, alumina and zirconia in the approximate weight ratio of 95:4:1.

Example VII

A butane-butylene fraction containing 18 volume per cent butylene and 82 volume per cent butanes was admixed with sufficient benzene to produce a molar benzene-butylene ratio of about 6:1 and the mixture was passed in liquid phase at 325 F. and 200 pounds gage pressure over synthetic silica-alumina gel catalyst. At a flow rate of 1.5 liquid volumes of charge per volume of catalyst per hour, corresponding to a reaction time of about 40 minutes, the butylenes were substantially completely reacted with formation of butylbenzenes. The excess of benzene was employed to effectively suppress butylene polymerization.

Butanes, benzene, and material lower boiling than butylbenzene were separated from the alkylate by fractionation, the butanes being removed from the system while the benzene fraction was recycled to the alkylation catalyst.

While the foregoing discussion has been relatively specific to the alkylation of benzene, and benzene has been used to typify an alkylatable aromatic hydrocarbon, it will be apparent that this invention may also be applied to homologs of benzene such as toluene, xylene, ethylbenzene, and other alkyl benzenes to introduce additional alkyl groups. Other benzenoid compounds susceptible to alkylation include compounds in which one or more nuclear carbon atoms are attached to groups other than alkyl groups, such as phenols, halogen derivatives, etc. The benzenoid compound is preferably a liquid under the disclosed process conditions or in some cases may be present in solution in a suitable hydrocarbon or other substantially inert solvent. Aromatic compounds unstable under the treating conditions or tending to poison the catalyst through decomposition or other reactions are, of course, unsuitable in the process.

The foregoing disclosure has included detailed descriptions of the operation and the outstanding advantages of the process of this invention and further illustrated specific application thereof. Other applications and even combinations of this process with operations such as refining, conversion, and/or manufacturing steps to produce and/or utilize raw materials and/or products as set forth above will be discernible from the disclosure and valuable in proportion to the benefits thereof. Therefore the scope of the invention is limited only as defined in the following claims.

I claim:

1. An improved process for the production of a monoalkyl benzene wherein the alkyl group contains from two to six carbon atoms from benzene and an aliphatic olefin which has from two to six carbon atoms per molecule which comprises passing a liquid stream of benzene and said olefin in such proportions that the molar ratio of benzene to said olefin is substantially in excess of 1:1 through a bed of solid granular adsorbent contact catalyst contained in a reaction zone and consisting of synthetic silica gel subsequently promoted by a minor proportion of alumina, said catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable aluminum salt and thereby causing adsorption of hydrous alumina on the silica gel in an amount corresponding to from 0.1 to 2% of alumina by weight, and water-washing and drying the treated gel, each said drying being conducted at a temperature not greater than the subsequent reaction temperature, maintaining a pressure such as to maintain liquid phase in the reaction zone, carrying out said contacting at a temperature of from 200 to 700° F. and at a flow rate of from 0.1 to 10 liquid volumes of feed per hour per volume of catalyst, and thereby effecting alkylation of said benzene with said olefin and the production of said monoalkyl benzene as the principal reaction product.

2. The process of claim 1 wherein said olefin is a butene and wherein said temperature is from 200 to 450° F.

3. The process of claim 1 wherein said olefin is a normal butene and wherein said temperature is from 200 to 450° F.

4. The process of claim 1 wherein said olefin is propylene and wherein said temperature is from 250 to 450° F.

5. The process of claim 1 in which the acid used in preparation of said hydrous silica gel is sulfuric acid and in which said hydrolyzable aluminum salt used in activating said silica gel is aluminum sulfate.

6. An improved process for the production of a monoalkyl benzene wherein the alkyl group contains from two to six carbon atoms from benzene and a corresponding aliphatic olefin which has from two to six carbon atoms per molecule, which comprises passing a liquid stream of benzene and said olefin in such proportions that the molar ratio of benzene to said olefin is substantially in excess of 1:1 through a bed of solid granular adsorbent contact catalyst contained in a reaction zone and consisting of synthetic silica gel subsequently promoted by a minor proportion of alumina, said catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable aluminum salt and thereby causing adsorption of hydrous alumina on the silica gel in an amount corresponding to from 0.1 to 2 per cent of alumina by weight, and water-washing and drying the treated gel, each said drying being conducted at a temperature not greater than the subsequent reaction temperature, maintaining contents of said reaction zone under conditions of temperature and pressure such as to promote union of said olefin and benzene to form a corresponding monoalkyl benzene and introducing said reactants at a flow rate of from 0.1 to 10 liquid volumes of feed per hour per volume of catalyst, and recovering from effluents of said reaction zone a hydrocarbon fraction comprising a monoalkyl benzene so produced.

7. An improved process for the production of a monoalkyl derivative of an alkylatable aromatic hydrocarbon, which comprises passing a hydrocarbon mixture comprising an olefin hydrocarbon of not more than 6 carbon atoms per molecule and a molar excess of an alkylatable aromatic hydrocarbon through a bed of a solid granular catalyst under conditions of temperature and pressure such as to promote union of said olefin and said aromatic hydrocarbon to form a corresponding monoalkyl derivative thereof as the principal reaction, said granular catalyst comprising silica and at least 0.1 but not more than about 2 per cent by weight of alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules, each said drying being conducted at a temperature not greater than the subsequent reaction temperature, and recovering from effluents of said catalyst bed a fraction comprising a monoalkyl derivative of said aromatic hydrocarbon so produced.

8. The process of claim 7 in which said mineral acid is sulfuric acid and in which said aluminum salt is aluminum sulfate.

9. An improved process for the production of a monoalkyl derivative of an alkylatable aromatic hydrocarbon, which comprises passing a hydrocarbon mixture comprising an olefin hydrocarbon of not more than 6 carbon atoms per molecule and a molar excess of an alkylatable aromatic hydrocarbon through a bed of a solid granular catalyst under conditions of temperature and pressure such as to promote union of said olefin and said aromatic hydrocarbon to form a corresponding monoalkyl derivative thereof as the principal reaction, said granular catalyst comprising silica and from 0.1 to 2 per cent by weight of an oxide of a metal selected from groups III B and IV A of the periodic system and prepared by introducing an aqueous solution of an alkali silicate into an excess of a mineral acid and allowing the resulting mixture to set to form a silicic acid gel, washing said gel with water and only partially drying same to form a hydrous acidic silica gel, contacting the resulting silica gel with an aqueous solution of a hydrolyzable salt of a metal selected from groups III B and IV A of the periodic system to activate same by adsorption of a hydrous oxide of said metal thereon, and subsequently washing and drying the resultant activated material to form said granular catalyst, each said drying being conducted at a temperature not greater than the subsequent reaction temperature, and recovering from effluents of said catalyst bed a fraction comprising a monoalkyl derivative of said aromatic hydrocarbon so produced.

WALTER A. SCHULZE.

REFERENCES CITED

The following references are of record in the file of this patent:

UNITED STATES PATENTS

| Number | Name | Date |
|---|---|---|
| 2,147,985 | McKinney | Feb. 21, 1939 |
| 2,186,022 | Holm et al. | Jan. 9, 1940 |
| 2,290,211 | Schaad | July 21, 1942 |
| 2,245,734 | Subkow | June 17, 1941 |
| 2,242,960 | Sachanen et al. | May 20, 1941 |
| 2,317,803 | Reeves et al. | Apr. 27, 1943 |
| 2,107,710 | Perkins et al. | Feb. 8, 1938 |
| 2,129,649 | Cross et al. | Sept. 13, 1938 |
| 2,213,345 | Marschner | Sept. 3, 1940 |
| 2,257,157 | Connolly | Sept. 30, 1941 |
| 2,258,786 | Melaven | Oct. 14, 1941 |
| 2,384,505 | Thomas et al. | Sept. 11, 1945 |

FOREIGN PATENTS

| Number | Country | Date |
|---|---|---|
| 456,637 | British | Nov. 12, 1936 |
| 316,951 | British | Nov. 6, 1930 |